United States Patent [19]

Mackal

[11] Patent Number: 5,306,187

[45] Date of Patent: Apr. 26, 1994

[54] INFLATOR MANIFOLD HAVING PLASTIC PARTS

[76] Inventor: Glenn H. Mackal, 2586 25th Ave. North, St. Petersburg, Fla. 33713

[21] Appl. No.: 34,055

[22] Filed: Mar. 22, 1993

[51] Int. Cl.$^5$ ............................................. F16K 15/20
[52] U.S. Cl. ..................................... 441/41; 285/901; 137/232; 137/853
[58] Field of Search ............... 441/41, 40, 66, 90–101; 114/345; 285/357, 901; 138/89.1–89.4; 137/223, 232, 853

[56] References Cited

U.S. PATENT DOCUMENTS

| | | | |
|---|---|---|---|
| 3,142,850 | 8/1964 | De Boer | 441/41 |
| 3,724,488 | 4/1973 | Featherstone | 137/232 |
| 3,754,731 | 8/1973 | Mackal et al. | 441/41 |
| 3,983,907 | 10/1976 | Sorensen | 137/223 |
| 3,995,653 | 12/1976 | Mackal et al. | 137/234 |
| 4,413,645 | 11/1983 | Seabase et al. | 441/41 |

*Primary Examiner*—Edwin L. Swinehart
*Attorney, Agent, or Firm*—Joseph C. Mason, Jr.; Ronald E. Smith

[57] ABSTRACT

An inflator manifold made of plastic materials that is as strong as metallic inflator manifolds and that has the same external dimensions of metallic inflator manifolds so that it meets industry strength and size standards. The outermost end of the inflator manifold is capped by an end cap having external and internal threads so that a double screw threaded engagement is achieved that matches the strength of metallic threads. The side walls of the inflator manifold are thickened in an internal direction so that the bore for gaseous fluids under pressure entering the article to be inflated has a diameter less than the diameter of a bore of a metallic inflator manifold. A check valve that admits gaseous fluids into the article is formed by positioning a tubular plastic member in the bore, capping the innermost end of the tubular plastic member with an imperforate plate, and forming at least one aperture in the tubular plastic member just inwardly of the capped innermost end so that the gaseous fluids are constrained to flow through the at least one aperture. A resilient sleeve covers the at least one aperture when no gaseous fluid is flowing, and is lifted from the at least one aperture by the force of the flow of the gaseous fluid only when the article is being inflated.

5 Claims, 2 Drawing Sheets

INFLATOR MANIFOLD HAVING PLASTIC PARTS

BACKGROUND OF THE INVENTION

1. Field of the Invention

This invention relates, generally, to inflator manifolds of the type used to rapidly inflate life jackets and other inflatable articles. More particularly, it relates to an inflator manifold having plastic parts.

2. Description of the Prior Art

When $CO_2$ or other suitable gaseous fluid is used to inflate an inflatable article, a check valve must be provided in the inflator manifold to block reverse flow of the gaseous fluid.

The known inflator manifold assemblies include effective check valves and otherwise perform their intended function, but they are somewhat expensive due to their metallic construction. It might at first appear reasonable to use a less expensive material such as a plastic, but a number of considerations have prevented the art from adopting plastic as a material from which the assemblies could be made. First of all, plastic lacks the strength of metal and a plastic manifold having the same wall thickness as a metallic manifold will fail at a lower pressure than its metallic counterpart. Next, industry standards have been promulgated that limit the external diameter of inflator manifolds. Thus, if the walls of a plastic manifold are thickened in an external direction to provide greater strength, the resulting manifold does not meet the prescribed standard size. If the walls are thickened in an inward direction, the bore or passageway for the gaseous fluid becomes so small that the conventional check valve assembly will not fit therein.

Accordingly, the conventional wisdom is that plastic inflator manifolds are impractical and will not become practical until the industry standards are changed to allow larger manifolds, or until super strong plastics are developed.

SUMMARY OF THE INVENTION

A plastic inflator manifold made of conventional plastic materials but having the strength of a metallic manifold and having a small diameter gaseous fluid passageway with an operable one way valve derives its strength from inwardly-thickened walls; accordingly, its external diameter matches the industry standard. The one way valve assembly includes a plastic tubular member positioned in the bore through which gaseous fluid flows during inflation of the inflatable article. The innermost end of the tubular member is capped with an imperforate end plate. One or more circumferentially spaced apertures are formed in the cylindrical sidewalls of the tubular member near said innermost end, and said tubular member is positioned within a flexible, resilient, gas-impervious sleeve made of an elastomeric material. When in repose, the sleeve covers the aperture or apertures formed near the innermost end of the tubular member. The innermost end of the tubular member and the sleeve within which it is positioned extend slightly into an opening formed in the walls of the inflatable article for admitting the gaseous fluid, and the diameter of that opening is greater than the diameter of the passageway for said gaseous fluid. Accordingly, when gaseous fluid is admitted into the bore, it is constrained by the imperforate end cap to exit said tubular member through the apertures formed therein. The force of the gaseous fluid flowing through said apertures lifts the elastomeric sleeve member away from said apertures so that said gaseous fluid may flow therethrough. When the gaseous fluid ceases to flow, the resiliency of the sleeve returns it to its position of repose, in overlying relation to said apertures, so that gaseous fluid in the inflatable article cannot flow into said passageway. In this manner, the sleeve acts as a check valve.

The resilient sleeve, since it extends the entire length of the tubular member, also provides a seal around said tubular member so that said gaseous fluid cannot flow around it.

Another important feature of the novel assembly is a plastic end cap that screw threadedly engages the manifold as securely as a metallic end cap. The screw threaded outermost end of the manifold is modified by inwardly thickening the walls thereof for increased strength, and forming internal threads on the thickened walls. The novel end cap is internally and externally threaded to engage the internal and external threads of the manifold, and further includes a wedge member that urges the threads of the manifold radially outwardly so that said threads more tightly engage the threads formed in the end cap.

It is therefore understood that a primary object of this invention is to provide the world's first inflator manifold formed primarily of plastic parts.

A related object is to provide a unique one way valve mechanism that can be used in numerous devices other than inflator manifolds.

Another object is to provide a plastic end cap for inflator manifolds that has a strength similar to metallic end caps.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
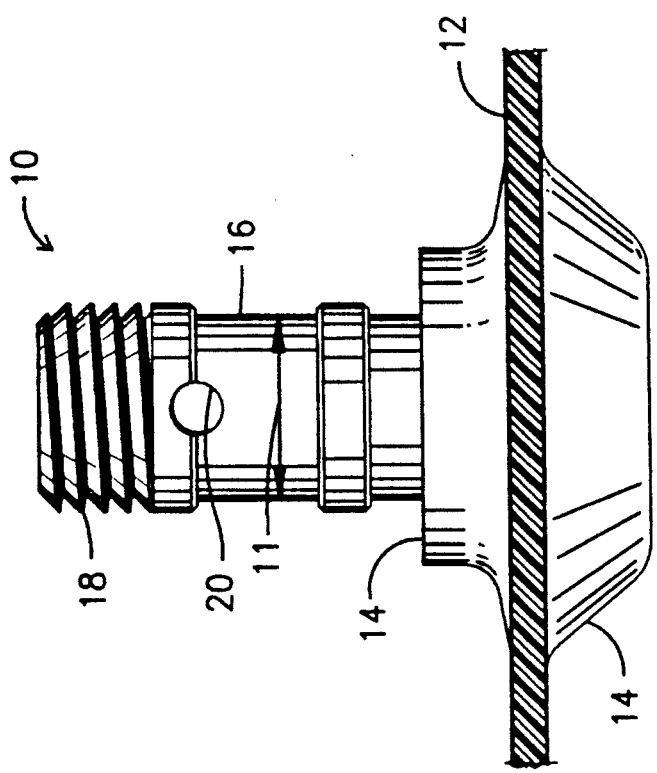
FIG. 1 is an elevational view of the novel inflator manifold.

Referring now to FIG. 1, it will there be seen that an illustrative embodiment of the present invention is denoted as a whole by the reference numeral 10.

The elastomeric exterior wall or surface of the inflatable article that is remote from where the inflator manifold joins the article is denoted 12, and the thickened part thereof in the region of such joinder is denoted 14.

Manifold 10 includes a tubular main body part 16 the outermost end of which is externally threaded as at 18. Opening 20 formed in tubular part 16 admits gaseous fluid under pressure into the tubular bore thereof. A suitable cap, not shown in FIG. 1, screw threadedly engages screw threads 18 to constrain the gaseous fluid entering opening 20 to flow into the inflatable article having walled surface 12.

Manifold 10, although made of plastic, has the same external size and shape as a metallic manifold; its diameter 11 is equal to the industry standard diameter. Thus, FIG. 1 could be construed as depicting the preferred embodiment of the invention as well as a metallic manifold of the prior art because, again, the novel construction and the conventional construction have the same external appearance. Thus, the novel manifold complies with all industry standards relating to size. For the reasons explained in more detail hereinafter, it also meets or exceeds all industry standards relating to strength, even though it is made of conventional plastic materials.

Figure 2:
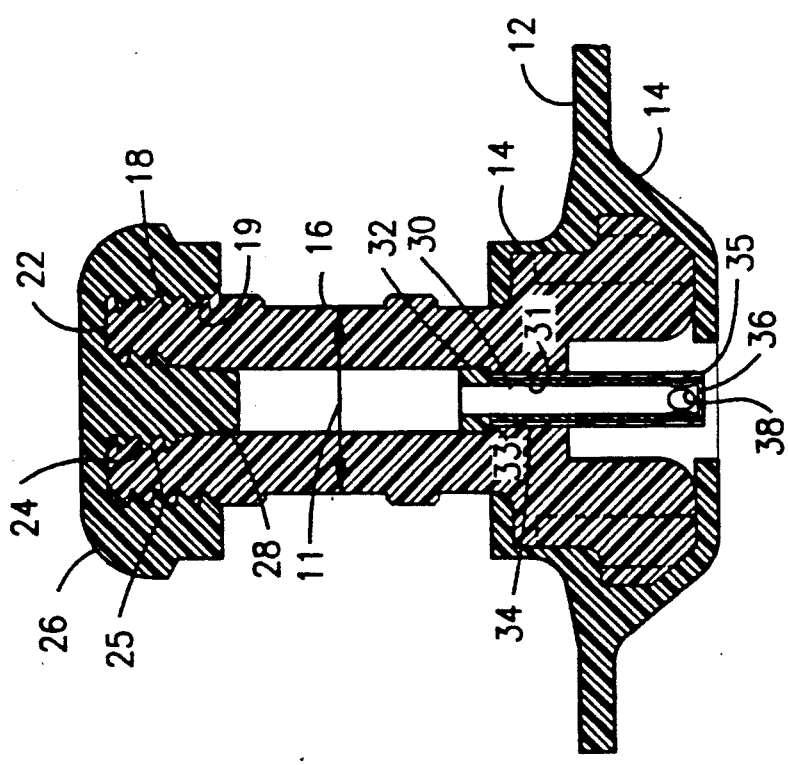
FIG. 2 is a sectional view of the novel manifold when in repose.

The novel internal structure of manifold 10 is depicted in FIG. 2. The tubular sidewalls of main body 16 are thickened along the entire extent thereof as at 22, thereby reducing the diameter of the tubular bore defined by main body 16, and internal threads 24 are formed in said sidewalls at the outermost end thereof. External threads 18 and said internal threads 24 are both screw threadedly engaged by complemental threads 19 and 25, respectively, formed in end cap 26. End cap 26 further includes a centrally disposed frustoconical spreading means or wedge 28 that urges sidewalls 22 radially outwardly as said end cap 26 is tightened onto threads 18, 24. Thus, the engagement between said threads 18, 24 and the mating threads formed in said end cap is enhanced. Note further that sidewalls 22 are slightly thinner at the outermost end thereof to provide a slight downward taper, in the innermost to outermost direction, that ensures a strong screw threaded engagement between the end cap 26 and manifold 10. These novel features enable sidewalls 22, end cap 26, and the respective threads formed therein to be formed of conventional plastic materials. Tests have shown that the interconnection between end cap 26 and manifold 10 is sufficient to meet or exceed industry strength requirements, as mentioned earlier.

The novel one way valve assembly is depicted at the lower part of FIG. 2. The assembly includes a plastic tubular member 30 having cylindrical side walls that define a passageway 31 that has an internal diameter too small to accommodate a conventional check valve assembly. Tubular member 30 is slideably disposed within the bore defined by main body 16. The small internal diameter of passageway 31 is a result of the thickening, in the radially inward direction, of sidewalls 22 of main body 16 of inflator manifold 10. It should be observed that the bore has three distinct sections. The outermost section has a first predetermined diameter and the innermost section has a second predetermined diameter that is greater than said first diameter. A third section has a third predetermined diameter less than the diameter of the first section. Thus, an annular shoulder is creater where the first and third sections meet.

Base 32 of tubular member 30 is widened at its outermost end to provide an annular shoulder 33. Said annular shoulder 33 seats against the above-mentioned annular shoulder where the first and third sections of the bore meet. An elastomeric sleeve member 34 extends from said base 32 and shoulder 33 in ensleeving relation to said tubular member 30 to the innermost end 35 of said tubular member 30. The diameter of sleeve member 34 in repose is less than the external diameter of plastic tubular member 30 so that said sleeve member tightly overlies said plastic tubular member when said sleeve member is in repose.

An imperforate plate 36 caps the innermost end 35 of tubular member 30 so that gaseous fluid flowing through passageway 31 in the direction indicated by arrow 37 is constrained to exit tubular member 30 through at least one aperture 38 formed in said cylindrical side walls just outwardly of said innermost end 35 of said plastic tubular member 30.

FIG. 2 shows how elastomeric sleeve 34 overlies said at least one aperture 38 when no gaseous fluid is flowing in the direction indicated by directional arrow 37. In view of imperforate end cap 36 and the covering of said at least one aperture 38 by gas-impervious sleeve 34, it should be understood that gaseous fluid in the inflatable article 12 can not flow out of said inflatable article.

Figure 3:
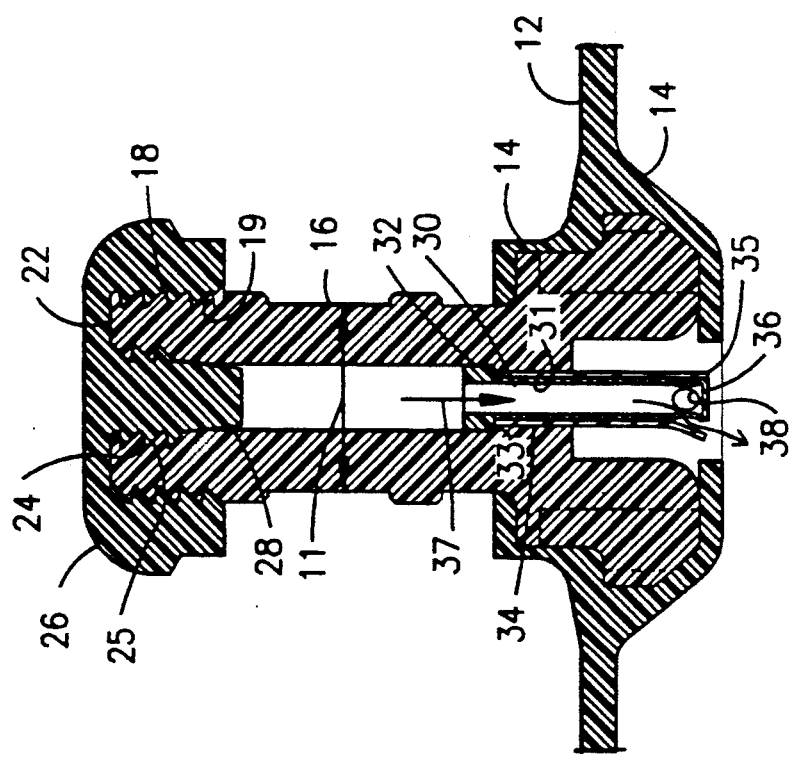
FIG. 3 is a sectional view of the novel manifold when gaseous fluid under pressure is flowing therethrough.

FIG. 3 depicts the flared-out position of the innermost end of sleeve 34 when gaseous fluid is flowing in the direction indicated by arrow 37. Small arrows 39 depict the flow of gaseous fluid into the article 12 being inflated. Note that said at least one aperture 38 is now uncovered, said uncovering being accomplished by the force of the flow of gaseous fluid as mentioned earlier. Sleeve 34 is resilient, so that when the flow of gaseous fluid from the pierced $CO_2$ cartridge (not shown) ceases, said sleeve will return to its aperture-closing position of repose as depicted in FIG. 2, thereby preventing reverse flow of the gaseous fluid so that the inflated article remains inflated.

Sleeve 34 also performs the function of preventing the gaseous fluid under pressure from bypassing tubular member 30; thus, it provides a seal between the external cylindrical surface of said tubular member 30 and the surface of the cylindrical bore formed in tubular main body 16. More particularly, note that sleeve 34 forms a tight seal along said third section of the bore.

This invention is clearly new and useful. Moreover, it was not obvious to those of ordinary skill in this art at the time it was made, in view of the prior art considered as a whole as required by law.

This invention pioneers the art of plastic inflator manifolds. Accordingly, the claims that follow are entitled to broad interpretation, as a matter of law, to protect from piracy the heart or essence of this breakthrough invention.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. An inflator manifold, comprising:
a tubular main body having an outermost end and an innermost end, said innermost end being embedded in thickened side walls of an article to be inflated;
said tubular main body being formed of a plastic material,
said tubular main body defining a bore through which gaseous fluid under pressure flows when said inflator manifold is being used to inflate said article to be inflated;

said bore having a first diameter at its outermost end, a second diameter at its innermost end, said second diameter being greater than said first diameter, and a third diameter between said outermost and innermost ends, said third diameter being less than said first diameter and said third diameter therefore forming a radially inwardly extending annular shoulder where said first diameter changes to said third diameter, said bore thus having a first, a second, and a third section;

an end cap for closing said outermost end of said tubular main body;

a plastic tubular member, having an innermost end and an outermost end, slidably disposed in said bore;

an imperforate plate for closing said innermost end of said plastic tubular member;

a radially outwardly extending base member formed in said outermost end of said plastic tubular member, an annular shoulder being formed in said plastic tubular member by said base member;

at least one aperture formed in the innermost end of said plastic tubular member, in the side wall of said plastic tubular member, just outwardly of said imperforate plate;

a resilient sleeve member, having an outermost end and an innermost end, disposed in ensleeving relation to said plastic tubular member, said outermost end of said resilient sleeve member abutting said annular shoulder formed in said plastic tubular member by said base member, said at least one aperture being covered by said innermost end of said sleeve member when said sleeve member is in repose, and said at least one aperture being uncovered when said sleeve member is not in repose;

said resilient sleeve member providing a seal between said plastic tubular member and said third section of said bore so that gaseous fluid introduced into said outermost end of said bore cannot bypass said plastic tubular member by flowing around it;

whereby when gaseous fluid under pressure flows through said plastic tubular member toward said article to be inflated, said imperforate plate constrains said gaseous fluid to exit said plastic tubular member through said at least one aperture, and wherein the force of said flow separates said resilient sleeve member from said plastic tubular member in the vicinity of said at least one aperture; and whereby the resiliency of said sleeve member returns said sleeve member to overlying relation to said at least one aperture upon cessation of said flow.

2. The inflator manifold of claim 1, wherein the outermost end of said tubular main body is externally and internally threaded, and wherein said end cap is complementally threaded.

3. The inflator manifold of claim 2, wherein said end cap is made of plastic.

4. The inflator manifold of claim 3, wherein said end cap further includes a central wedge member that drives the outermost end of said tubular member radially outwardly as said end cap is tightened onto said tubular member so that the screw threads of said end cap and tubular members are more tightly engaged.

5. The inflator manifold of claim 4, wherein the sidewalls of the tubular main body are slightly downwardly tapered relative to an innermost to outermost direction so that the outermost end of the sidewalls of said tubular member are progressively thinner to thereby enhance the screw-threaded engagement between said outermost end and said cap member.

* * * * *